United States Patent
Habibvand

(10) Patent No.: US 8,690,446 B2
(45) Date of Patent: Apr. 8, 2014

(54) THERMALLY COMPLIANT BEARINGS WITH ROLLING ELEMENT UNLOADER RACE RELIEFS

(75) Inventor: Alex Habibvand, Orange, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 174 days.

(21) Appl. No.: 13/273,756

(22) Filed: Oct. 14, 2011

(65) Prior Publication Data

US 2012/0087611 A1   Apr. 12, 2012

Related U.S. Application Data

(63) Continuation-in-part of application No. 11/707,518, filed on Feb. 16, 2007, now abandoned.

(60) Provisional application No. 60/876,954, filed on Dec. 21, 2006.

(51) Int. Cl.
*F16C 33/60* (2006.01)
*F16C 33/04* (2006.01)

(52) U.S. Cl.
USPC .......................................... 384/502; 384/493

(58) Field of Classification Search
USPC ......... 384/457, 492, 493, 499, 501–503, 505, 384/506, 513, 557, 905, 504
See application file for complete search history.

(56) References Cited

U.S. PATENT DOCUMENTS

| | | | |
|---|---|---|---|
| 1,334,027 A * | 3/1920 | Forsberg | ....................... 384/516 |
| 2,650,864 A | 9/1953 | Mergen | |
| 3,639,017 A | 2/1972 | Schoen et al. | |
| 3,647,269 A | 3/1972 | McKee | |
| 3,975,067 A | 8/1976 | Martin | |
| 4,073,551 A | 2/1978 | Sutowski | |
| 4,324,444 A | 4/1982 | Buczynski et al. | |
| 4,363,527 A | 12/1982 | Thrasher | |
| 5,102,241 A | 4/1992 | Pflungner | |
| 5,632,562 A | 5/1997 | Kidzun et al. | |
| 2008/0152269 A1 | 6/2008 | Habibvand | |
| 2008/0285903 A1 * | 11/2008 | Olsen | ........................... 384/516 |

FOREIGN PATENT DOCUMENTS

| | | |
|---|---|---|
| DE | 3245433 A1 | 4/1984 |
| GB | 134992 A | 11/1919 |
| GB | 1464008 | 2/1977 |
| JP | 55149418 A | 11/1980 |
| JP | 2007002914 A | 1/2007 |

OTHER PUBLICATIONS

International Search Report from PCT/US2012/058958 dated Dec. 4, 2012.
PCT International Search Report and the Written Opinion of the International Searching Authority dated Apr. 16, 2008; (PCT/US2007/024770).
RBC Bearings Catalog, Radial, Angular, and 4-point Contact, Thin Section Ball Bearings, RBC 02/11.

* cited by examiner

*Primary Examiner* — James Pilkington
(74) *Attorney, Agent, or Firm* — MKG, LLC

(57) ABSTRACT

A bearing is provided that includes a first ring having at least one first raceway defined by a radially inward facing surface of the first ring; and a second ring concentric with the first ring and having at least one second raceway defined by a radially outward facing surface of the second ring. The bearing includes a plurality of rolling elements disposed between the first and second rings. The rolling elements rollingly engage the first and second raceways. The first ring has a first gap therein and the second ring has a second gap therein. One or more race reliefs extend into the first raceway and/or the second raceway.

21 Claims, 8 Drawing Sheets

THERMALLY COMPLIANT BEARINGS WITH ROLLING ELEMENT UNLOADER RACE RELIEFS

CROSS-REFERENCE TO RELATED APPLICATION

This application is a continuation in part of U.S. patent application Ser. No. 11/707,518, filed Feb. 16, 2007 which claims the benefit of U.S. provisional application No. 60/876,954, filed Dec. 21, 2006, the contents of which are incorporated herein by reference in their entirety.

FIELD OF THE INVENTION

The present invention is generally directed to a thermally compliant bearing, and more particularly to a double split ring bearing having race reliefs formed in raceways of the bearing for unloading rolling elements which travel over splits in the bearing rings.

BACKGROUND

Rolling element bearings ("rolling bearings") are well-known to comprise a plurality of rolling elements (balls, rollers, or the like) situated between two rings or races that are annular in configuration. For purposes of strength, economy and durability, bearings are often made from metal, e.g., steel.

Airborne systems commonly make use of large azimuth rolling bearings, e.g., bearings having an inner diameter of about 15.25 centimeters (cm) (6 inches (in.)) or more. The bearings are installed in rotating mechanisms (each of which comprises a rotating structure that rotates relative to a support structure) that have to be made from light aluminum alloys in order to control weight. Such bearings and rotating mechanisms can be found in airborne applications including electro-optical targeting system gimbals for camera mounts, search light gimbals, and elsewhere. Conventional bearings are installed and fitted in such mechanisms for optimum stiffness and rotational torque at ambient temperature, but the bearings exhibit significant variations in performance at extremes of temperature in actual use. At one temperature extreme, the bearing will be internally over-loaded to much higher stiffness and rolling friction torque than is optimal; yet at another extreme, the bearing internal preload may be compromised, resulting in loss of stiffness or excessive deflection. Such temperature-related variations in bearing performance are caused by differences in coefficient of thermal expansion (CTE) between the bearing materials (e.g., hardened steels) and the materials used for the rotating mechanism (e.g., aluminum alloys). These variations in bearing performance have to be carefully analyzed, and their consequences mitigated, often necessitating utilization of larger drive motors and/or using more expensive support structure alloys with CTE properties as close to bearing steel as possible.

SUMMARY

According to aspects disclosed herein, there is provided a bearing which includes a first ring having one or more first raceways. Each of the first raceways is defined by a radially inward facing surface of the first ring. The bearing also includes a second ring concentric with the first ring. The second ring has one or more second raceways. Each of the second raceways is defined by a radially outward facing surface of the second ring. The bearing includes a plurality of rolling elements disposed between the first and second rings. The rolling elements rollingly engage the first and second raceways. The first ring has a first gap therein and the second ring has a second gap therein. One or more race reliefs extend into the first raceway and/or the second raceway.

In one embodiment, one or more of the plurality of rolling elements is in an unloaded state when positioned in the race relief. In the unloaded state, operational forces applied to the rolling elements by the first and second rings, is reduced (or eliminated), compared to a loaded state wherein the rollers are subject to higher loads while rolling in the first and second raceway outside of the race reliefs.

The race reliefs may be tapered and/or have an arcuate contour such as a concave shape. The race reliefs may extend from the respective gap to the respective raceway. The race reliefs may have a width which is greater than and/or proportional to a diameter of the rolling elements.

In one embodiment, the bearing is a large azimuth bearing and the first gap is about 1.27 mm to about 1.78 mm wide at room temperature, and the second gap is about 1.27 mm to about 1.78 mm wide at room temperature.

There is also disclosed herein a method for forming a race relief in a bearing raceway. A bearing having at least one ring defining a raceway formed circumferentially around the ring and extending laterally between opposing end faces defined by the ring, is provided. The raceway has a first width. A grinding wheel configured for rotation about an axis, is also provided. The grinding wheel has a first diameter and a second width, greater than the first width. In addition, the grinding wheel has an arcuate cross section extending between lateral faces defined by the grinding wheel. The grinding wheel is positioned above the raceway so that the end faces of the ring and the lateral faces of the grinding wheel are substantially parallel. In addition, centerlines defined by the raceway and the grinding wheel are aligned. The grinding wheel is rotated about the axis and plunged into the raceway to a predetermined depth to form an arcuate race relief therein. The race relief has a width substantially equal to that of the grinding wheel.

DETAILED DESCRIPTION

The rolling bearings described herein facilitate rotation in rotating mechanisms that are subject to wide working temperature variations, e.g., from 80° C. to −50° C., and wherein the CTE of the bearing is materially different from (e.g., smaller than) the CTE of the rotating mechanism in which it is used, and for large azimuth bearings. The difference in CTE between the bearing and the rotating mechanism may be, e.g., about 50% to about 100% of the bearing CTE. For example, the CTE of the support structure may be equal to or greater than about 150% of the CTE of the bearing rings, optionally up to about 200% of the CTE of the bearing rings. The bearings have a double split ring design in which both rings (the inner ring and the outer ring) are split, i.e., they each have a gap disposed radially across them. The gaps allow the rings to contract and flex as their temperature is lowered and in response to the physical force imposed by the rotating mechanism that may be contracting or expanding at a different rate from that of the bearing. The bearings exhibit reduced temperature-induced variations in bearing performance relative to non-split ring bearings.

In bearings having a double-split ring design, both rings of the bearing have gaps in them. Once properly installed in the bearing support structure at room temperature, the bearings will maintain steady and have a predictable stiffness and torque characteristic throughout a wide temperature range, despite differences in CTE between the bearing and the support structure material. As a result, temperature-related variations in performance are greatly reduced, even if there is a significant difference between the CTE of the bearing material (e.g., steel) and the support structure material (e.g., aluminum). Thus, use of the bearings described herein results in improved rotating mechanism that comprise a support structure of a material having a different CTE from the bearing ring material, and in large azimuth bearings.

With knowledge of the CTE of the ring material, the width of the gap is chosen to approach zero at the lowest anticipated temperature and, if possible, to not exceed 50% of the ball diameter at the highest anticipated temperature. A gap having a width of about 0.76 millimeters (mm) (about 0.03 in.) to about 1.78 mm (about 0.07 in.) at room temperature will be suitable for many large azimuth bearings for airborne applications.

Figure 1:
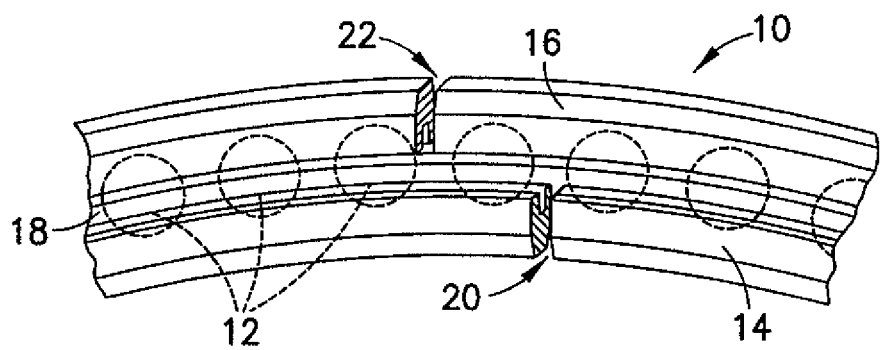
FIG. 1 is a partial isometric view of one embodiment of a split ring bearing as described herein.
Figure 2:
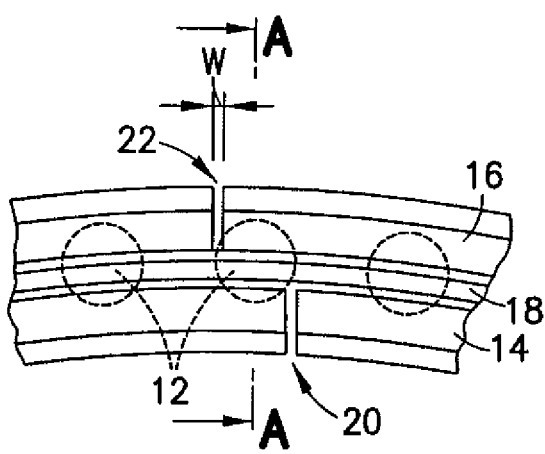
FIG. 2 is a partial elevation view of the bearing of FIG. 1.
Figures 3, 4:
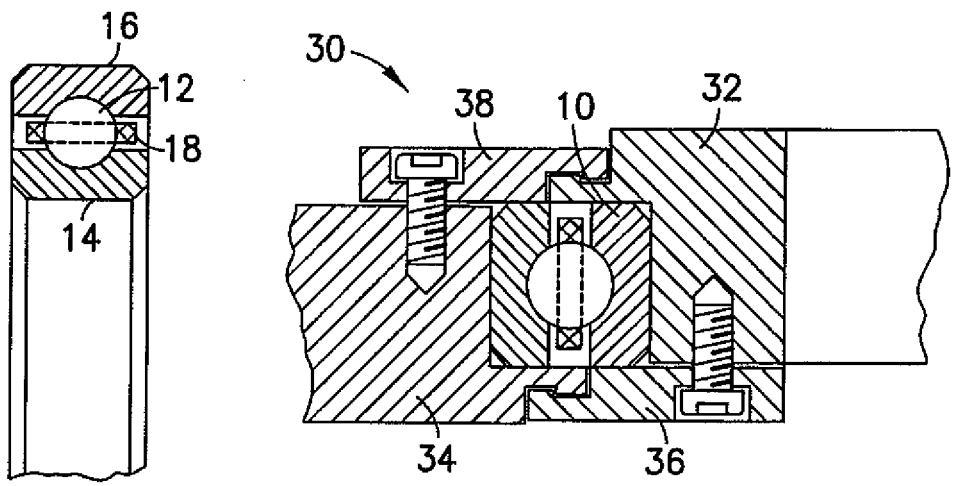
FIG. 3 is a cross-sectional view of the bearing of FIG. 2, taken along line A-A.
FIG. 4 is a schematic cross-sectional view of a rotating structure comprising a bearing as described herein.

One illustrative embodiment of a double split-ring rolling bearing is shown in FIGS. 1, 2 and 3. Bearing 10 is a ball bearing comprising a plurality of rolling element balls 12 held in place between an inner ring 14 and a concentric outer ring 16 by a cage 18. The inner ring 14 is generally annular, except that it has a gap 20 where it is split. The gap 20 has a width W. The outer ring 16 is also generally annular and is split at gap 22, which has a width similar to that of gap 20. In one illustrative embodiment, the bearing 10 is made from 440S stainless steel and comprises rings having diameters of about 790 mm (about 31 in.) and balls having a diameter of about 4.75 mm (about 3/16 in.), and has a gap of about 1.4 mm (0.05 in. to 0.06 in.) at room temperature. Thus, the gap is about 30% of the ball diameter.

Significant experimentation and analysis was required to arrive at the gap size of about 0.05 inches (1.27 mm) to about 0.07 inches (1.78 mm) wide at room temperature for large azimuth bearings. As gap size increases, it becomes more difficult to assemble the bearing 10. In addition, the gaps in the races of the large azimuth bearings cause the bearings to be flimsy and must therefore be handled with care during assembly and disassembly. For example, the races may axially shift with respect to one another during assembly and disassembly. Such shifting could cause the balls to fall from their position between the races. Thus significant trial and error experimentation was required to determine assembly and disassembly procedures for the bearings having the gaps sizes of about 0.05 inches (1.27 mm) to about 0.07 inches (1.78 mm) wide at room temperature.

The large azimuth bearings expand and contract significantly more than small bearings (e.g., those having race diameters of less than 6 inches). As a result, significant experimentation and testing was required to determine the gap sizes of about 0.05 inches (1.27 mm) to about 0.07 inches (1.78 mm) wide at room temperature. For example, room temperature tests and tests in thermal chambers were conducted. The testing and experimentation included torque testing, assembly and disassembly tests, noise tests and vibration tests.

A variety of rolling bearings can have split rings as described herein: ball bearings, roller bearings, needle bearings, thrust bearings, etc.

In FIG. 4, bearing 10 is shown in use in a rotating mechanism 30, which may be, for example, a search light gimbal. Mechanism 30 comprises a support structure 32 about which bearing 10 is situated and a rotating structure 34 mounted on bearing 10. In particular, the inner ring of bearing 10 is secured to the support structure 32, while the outer ring of bearing 10 is secured to rotating structure 34. A first clamp 36 is secured to support structure 32 and engages rotating structure 34 in an annular tabled lap joint. Similarly, a second clamp 38 secured to the rotating structure 34 engages the support structure 32 in an annular tabled lap joint. The bearing 10 and the joints 36 and 38 facilitate the rotation of rotating structure 34 relative to support structure 32. The support structure 32 and, optionally, the rotating structure 34, may be made from aluminum or known aluminum alloys having a CTE of about $13 \times 10^{-6}$ in./in./° F. (about $2.3 \times 10^{-5}$ in./in./° C.), whereas the rings of bearing 10 may be made from steel having a CTE of about $8.2 \times 10^{-6}$ in./in./° F. (about $1.5 \times 10^{-5}$ in./in./° C.). Thus, the rotating mechanism has a CTE that is about 60% greater than the CTE of the bearing rings, i.e., the support structure CTE is equal to about 160% of the bearing ring CTE. The split ring structure of bearing 10 allows it to maintain good performance over a wide temperature range despite the difference in CTE between the bearing material and the support structure material.

Rotating mechanisms that comprise conventional, non-split ring roller bearings and in which there is a significant difference between the rotating mechanism CTE and the bearing ring CTE can be improved by replacing the non-split bearing with a bearing comprising gaps in the rings as described herein, even if the split ring bearing CTE is equivalent to that of the non-split ring bearing. A result will be a reduction in temperature-induced stress over the working temperature range of the mechanism even though the difference in CTE between the mechanism and the bearing therein is substantially unchanged.

Figure 5:
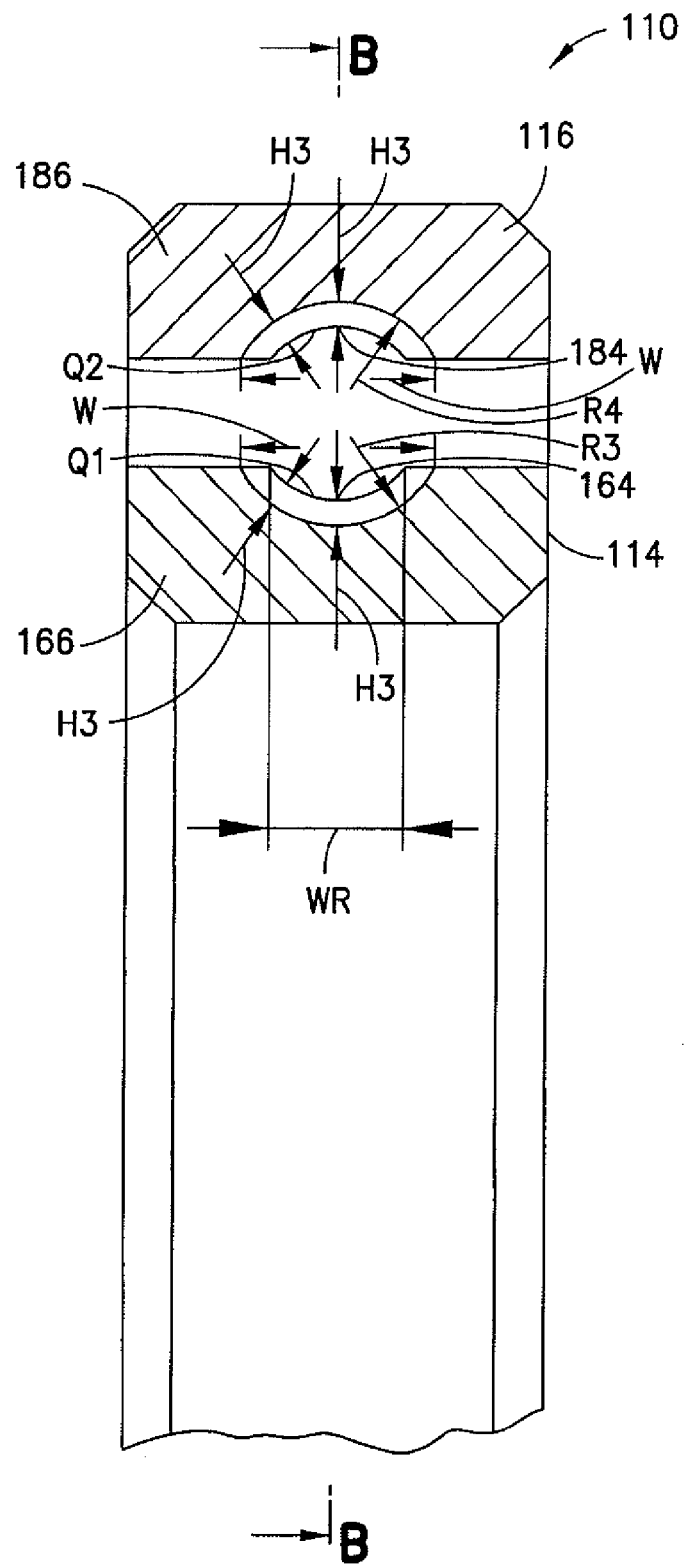
FIG. 5 is a partial cross-sectional view of a traverse section of a bearing having raceway reliefs formed therein and taken along line C-C of FIG. 6.
Figure 6:
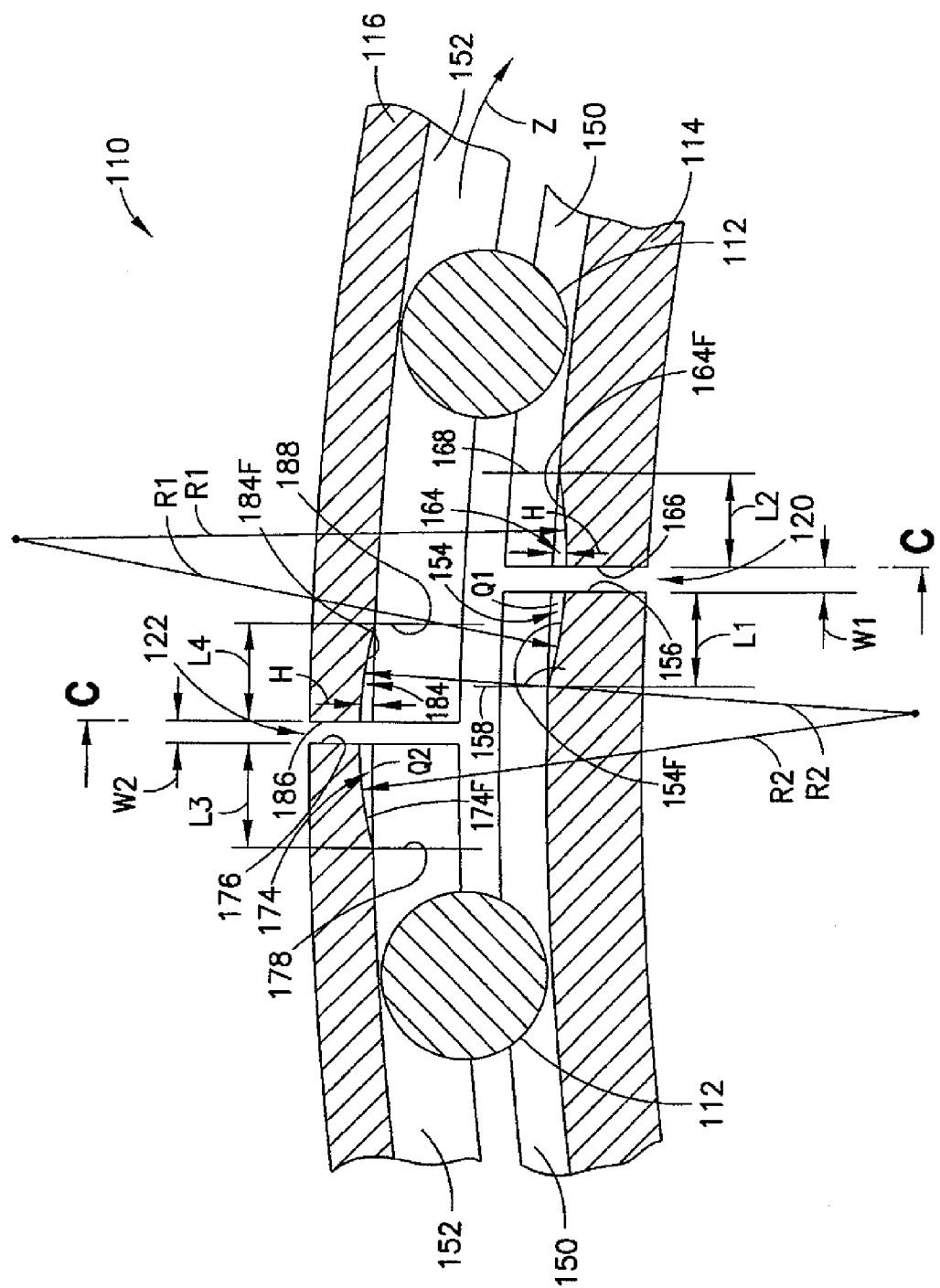
FIG. 6 is a partial cross-sectional elevation view of a split ring bearing of FIG. 5 taken along line B-B.

The bearing illustrated in FIGS. 5 and 6 are similar to the bearing 10 shown in FIGS. 1-4. Accordingly, like elements have been assigned like reference numbers preceded by the numeral 1. The bearing 110 illustrated in FIGS. 5 and 6 is a double split ring bearing having a plurality of rolling elements 112 (FIG. 6, rolling elements not shown in FIG. 5), for example, ball bearings, positioned between an inner ring 114 and a concentric outer ring 116. The inner ring 114 is generally annular and includes a gap 120 having a width W1 extending therethrough. The outer ring 116 is generally annular and includes a gap 122 having a width W2 extending therethrough. The inner ring 114 includes a first raceway 150 defined by an outwardly facing surface of the inner ring. The outer ring 116 includes a second raceway 152 defined by an inwardly facing surface of the outer ring. The first and second raceways 150 and 152 each have substantially uniform cross sections which are configured complementary to that of the rolling elements 112 and on which the rolling elements 112 roll. The rolling elements 112 rollingly engage the first and second raceways 150 and 152 and transfer loads, for example normal operating loads, between the inner and outer rings 114 and 116.

As described in detail below, the inner ring 114 and the outer ring 116 each include race reliefs (154 and 164) and (174 and 184), respectively, for example troughs, extending from opposing edges of the gaps 120 and 122 and formed in the first and second raceways 150 and 152, respectively. The race reliefs 154, 164, 174 and 184 increase the size of a portion of the raceways 150 and 152. Each of the race reliefs 154, 164, 174 and 184 have a width W which is greater than and proportional to the diameter of the rolling elements 112. The width W of the race relief is greater than a width WR of the first and second raceways 150 and 152, respectively. The race reliefs 154, 164, 174 and 184 have a maximum depth adjacent to the respective gaps 120 and 122. Each of the race reliefs 154, 164, 174 and 184 define a tapered face (i.e., first race relief face 154F, second race relief face 164F, third race relief face 174F and fourth race relief face 184F) which extends from the respective gap 120, 122 and merges with the first or second raceway 150 and 152, respectively.

The race reliefs 154, 164, 174 and 184 unload forces applied to the rolling elements 112 by the inner and outer rings 114 and 116, respectively. The magnitude of the race relief depth and the configuration of the race relief taper are selected so that the rolling elements 112 are in an unloaded state when present in the race reliefs 154, 164, 174 and 184 and over the gaps 120 and 122. In the unloaded state, load applied to the rolling elements 112 by the inner ring 114 and the outer ring 116 is gradually reduced (or eliminated) from the normal operating load and subsequently reapplied as the rolling elements 112 travel through the race reliefs 154, 164, 174 and 184. Thus the race reliefs 154, 164, 174 and 184 eliminate or substantially reduce noise, vibration and torque pulses caused by the rolling elements travelling over the gaps 120 and 122, compared to the gaps 20 and 22 (FIGS. 1-3) which have no race reliefs or those having sharp edges.

Figure 7:
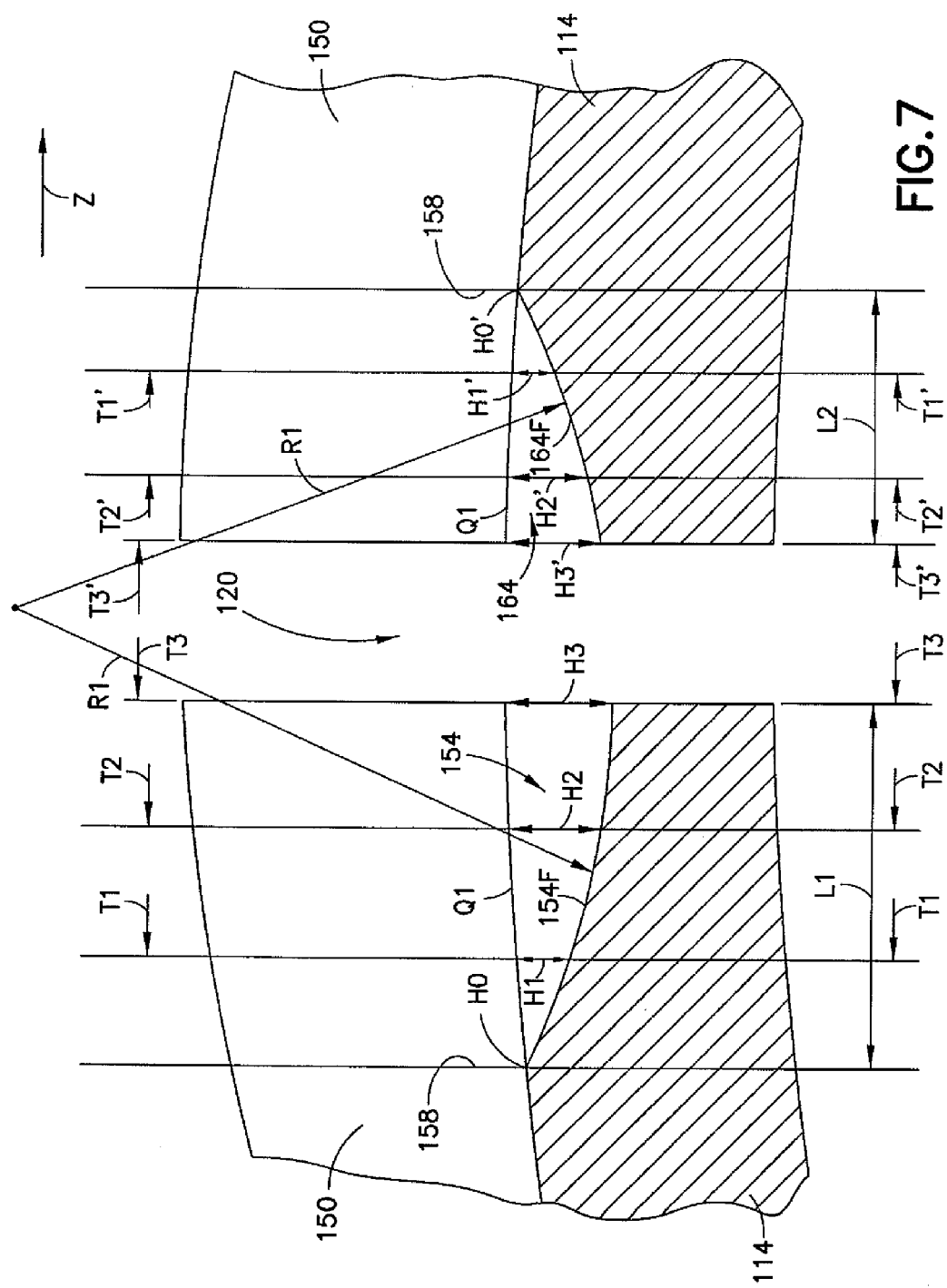
FIG. 7 is an enlarged view of a portion of the bearing of FIG. 6.

Referring to FIGS. 5-7, the inner ring 114 includes a first race relief 154 extending a distance L1 from an edge 156 of the gap 120 to a point 158 on the first raceway 150. Depth H of the first race relief 154 is the distance from a reference surface Q1, defined by a projection of the raceway 150, to the first race relief face 154F. The depth H of the first race relief 154 gradually increases when traversing the first race relief in a direction generally defined by the arrow Z. The depth H of the first race relief 154 increases from zero H0 at the point 158, to a greater depth H1 at a first traverse section taken along line T1-T1. The depth H further increase to a greater depth H2 at a second traverse section taken along line T2-T2. In addition, the depth H increases to a maximum depth H3 at the edge 156 of the gap 120 (i.e., at a third traverse section taken along line T3-T3). In one embodiment, the depth of the first race relief 154 is substantially uniform across the first, second and third traverse sections T1-T1, T2-T2, and T3-T3 and other traverse sections between the edge 156 and the point 158.

The inner ring 114 includes a second race relief 164 extending a distance L2 from an edge 166 of the gap 120 to a point 168 on the first raceway 150. Depth H of the second race relief 164 is the distance from a reference surface Q1, defined by a projection of the raceway 150, to the second race relief face 164F. The depth H of the second race relief 164 gradually decreases when traversing the second race relief in the direction generally defined by the arrow Z. The depth H of the second race relief 164 decreases from the maximum depth H3' at the edge 166 of the gap 120 (i.e., at the traverse section taken along line T3'-T3'), to a lesser depth H2' at a traverse section taken along line T2'-T2'. The depth decreases to a lesser depth H1' at a traverse section taken along line T1'-T1'. In addition, the depth decreases to zero H0' as the second race relief merges with the first raceway 150 at the point 168. In one embodiment, the depth of the second race relief 164 is substantially uniform across the first, second and third traverse section T1'-T1', T2'-T2', and T3'-T3' and other traverse sections between the edge 166 and the point 168.

Referring to FIGS. 5-6, the outer ring 116 includes a third race relief 174 extending a distance L3 from an edge 176 of the gap 122 to a point 178 on the second raceway 152. Depth H of the third race relief 174 is the distance from a reference surface Q2, defined by a projection of the raceway 152, to the third race relief face 174F. The depth H of the third race relief 174 gradually increases when traversing the third race relief in a direction generally defined by the arrow Z. The depth of the third race relief 174 progressively increases from zero at the point 178 to maximum depth H3 at a traverse section, located at the edge 176 of the gap 122. In one embodiment, the depth of the third race relief 174 is substantially uniform across each traverse section defined between the edge 176 and the point 178.

The outer ring 116 includes a fourth race relief 184 extending a distance L4 from an edge 186 of the gap 122 to a point 188 on the second raceway 152. Depth H of the fourth race relief 184 is the distance from a reference surface Q2, defined by a projection of the raceway 152, to the fourth race relief face 184F. The depth of the fourth race relief 184 gradually decreases when traversing the fourth race relief in the direction generally defined by the arrow Z. The depth of the fourth race relief 184 progressively decreases from a maximum depth at a traverse section located at the edge 186 of the gap 122 to zero as the fourth race relief merges with the second raceway 152 at the point 188. In one embodiment, the depth of the fourth race relief 184 is substantially uniform across each traverse section defined between the edge 186 and the point 188.

While the depths of the first, second, third and fourth race reliefs 154, 64, 174 and 184 are shown and described as being uniform across respective traverse sections, the present invention is not limited in this regard as the depths may be asymmetrical and/or non-uniform across the respective traverse sections without departing from the broader aspects disclosed herein.

In one embodiment, the maximum depth (e.g., H3 or H3') of any or all of the first through fourth race reliefs 154, 164, 174 and 184, respectively is about 0.1 mm (0.004 inches) to about 0.13 mm(0.005 inches). In one embodiment, the bearing is a large azimuth bearing and the first gap 120 is about 1.27 mm to about 1.78 mm wide at room temperature, and the second gap 122 is about 1.27 mm to about 1.78 mm wide at room temperature.

As shown in FIG. 6, circumferential sections of the first and second race relief faces 154F and 164F, respectively, have a radius of curvature R1, for example a concave arc of a circle; and circumferential sections of the third and fourth race relief faces 174F and 184F, respectively, have a radius of curvature R2, for example a concave arc of a circle. While the first through fourth race relief faces 154F-184F are shown and described as having radii of curvature R1 and R2, the present invention is not limited in this regard as the first through fourth race relief faces can be of any suitable contour including, but not limited to, convex, concave, arcuate, linear and parabolic contours or combinations thereof. In one embodiment, the radii of curvature R1 and R2 are equal. In one embodiment, one or both or the radii of curvature R1 and R2 is about 76.2 mm (3.0 inches) to about 127 mm (5.0 inches). In one embodiment, the magnitude of any or all of the distances L1, L2, L3 and/or L4 is about 0.25 mm (0.010 ) to about 5.1 mm (0.20 ) inches. In one embodiment, the magnitude of any or all of the distances L1, L2, L3 and/or L4 is determined based upon the diameter of the inner ring 114 and/or the outer ring 116.

As illustrated in FIG. 5, each traverse section of the second race relief 164 has a radius of curvature R3 and each traverse section of the fourth race relief 184 has a radius of curvature R4. Similarly, each traverse section of the first race relief 154 has a radius of curvature R3 and each traverse section of the third race relief 174 has a radius of curvature R4. In one embodiment, the radii of curvature R3 and R4 are equal. In one embodiment, the radii of curvature R3 and R4 are proportional to the diameter of the rolling elements 112 In one embodiment, the width W of any or all of the first through fourth race reliefs 154, 164, 174 and 184, respectively is about 0.2 mm (0.008 inches) to about 0.25 mm (0.01 inches) greater than the diameter of the rolling elements.

Figure 8:
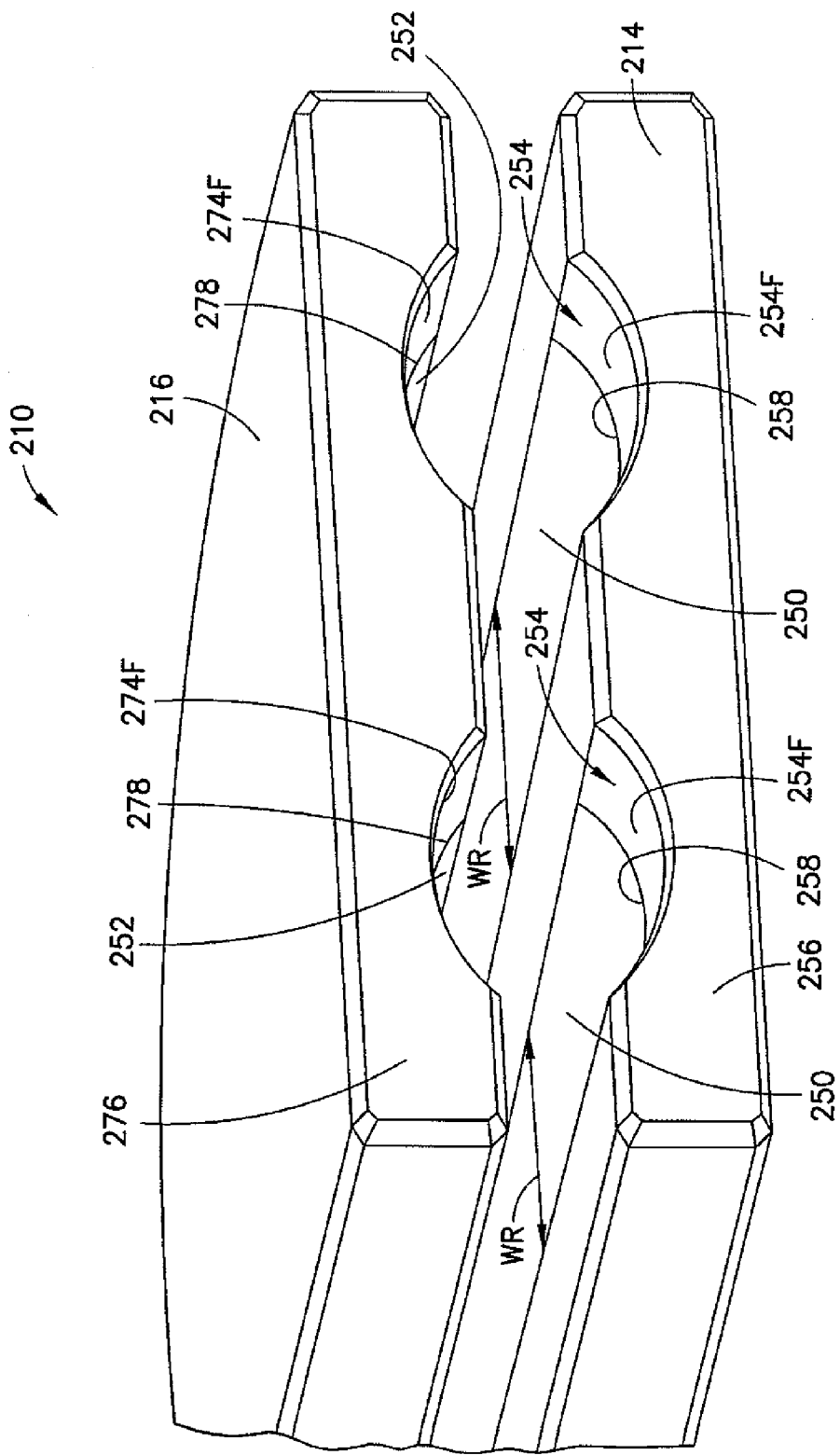
FIG. 8 is a perspective view of a portion of a bearing having two axially adjacent raceways with raceway reliefs formed therein.

The bearing illustrated in FIG. 8 is similar to the bearing 110 shown in FIGS. 5-7. Accordingly, like elements have been assigned like reference numbers with the first digit 1 being replaced by the numeral 2. The bearing 210 illustrated in FIG. 8 is a double split ring bearing in which the inner ring 214 and the outer ring 216 each have a pair of raceways 250 and 252, respectively. Additionally, each of the raceways 250 and 252 have race reliefs formed therein similar to those described above for the bearing 110. For example, two race reliefs 254 and 274 are illustrated in FIG. 8. While two raceways 250 and 252 are shown and described in FIG. 8, the present invention is not limited in this regard as bearing rings with one, three, four or more raceways may be employed without deviating from the broader aspects of the present invention.

Figure 9:
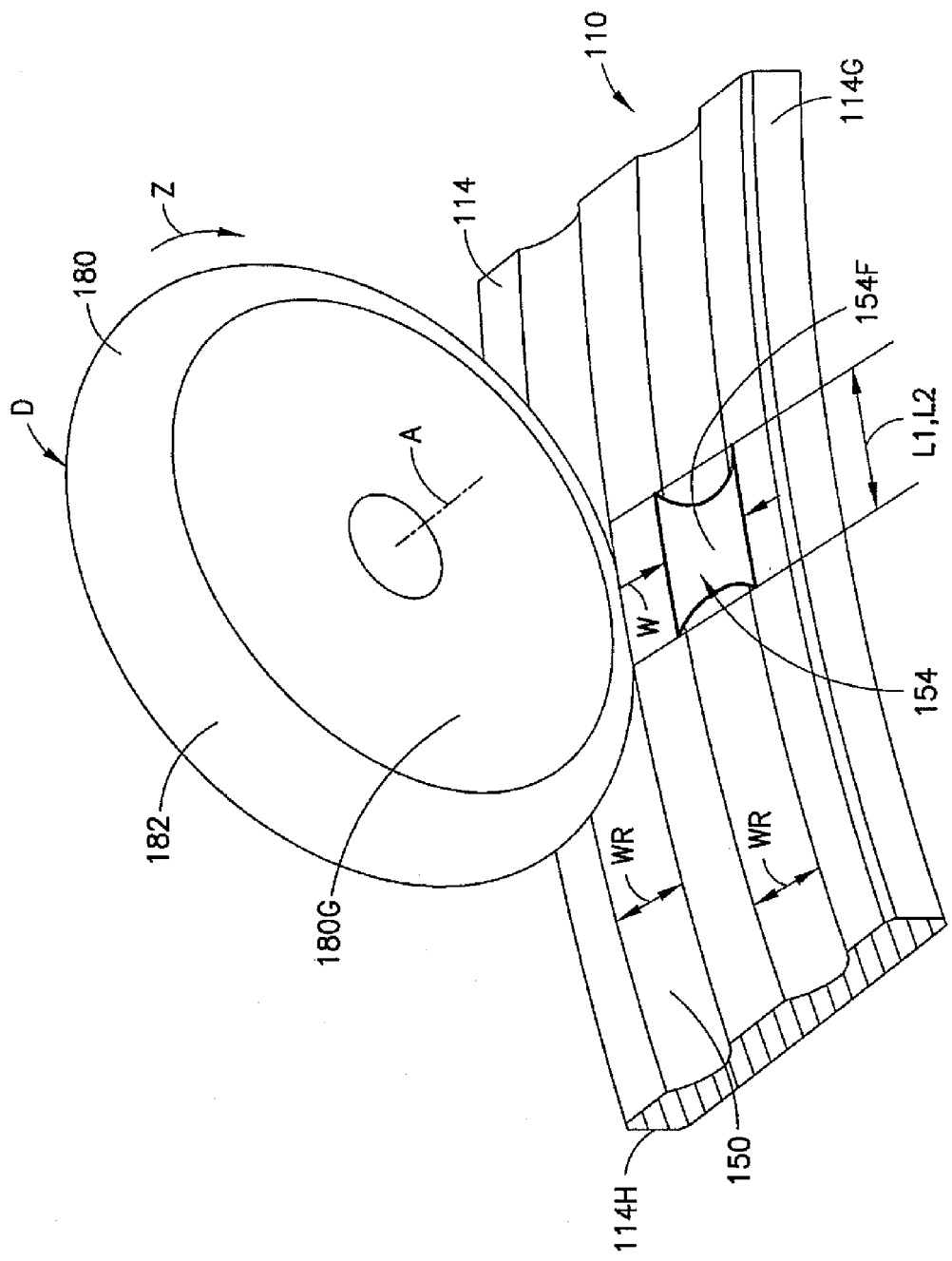
FIG. 9 is a perspective view of a grinding wheel configured to form a raceway relief in a bearing.
Figure 10:
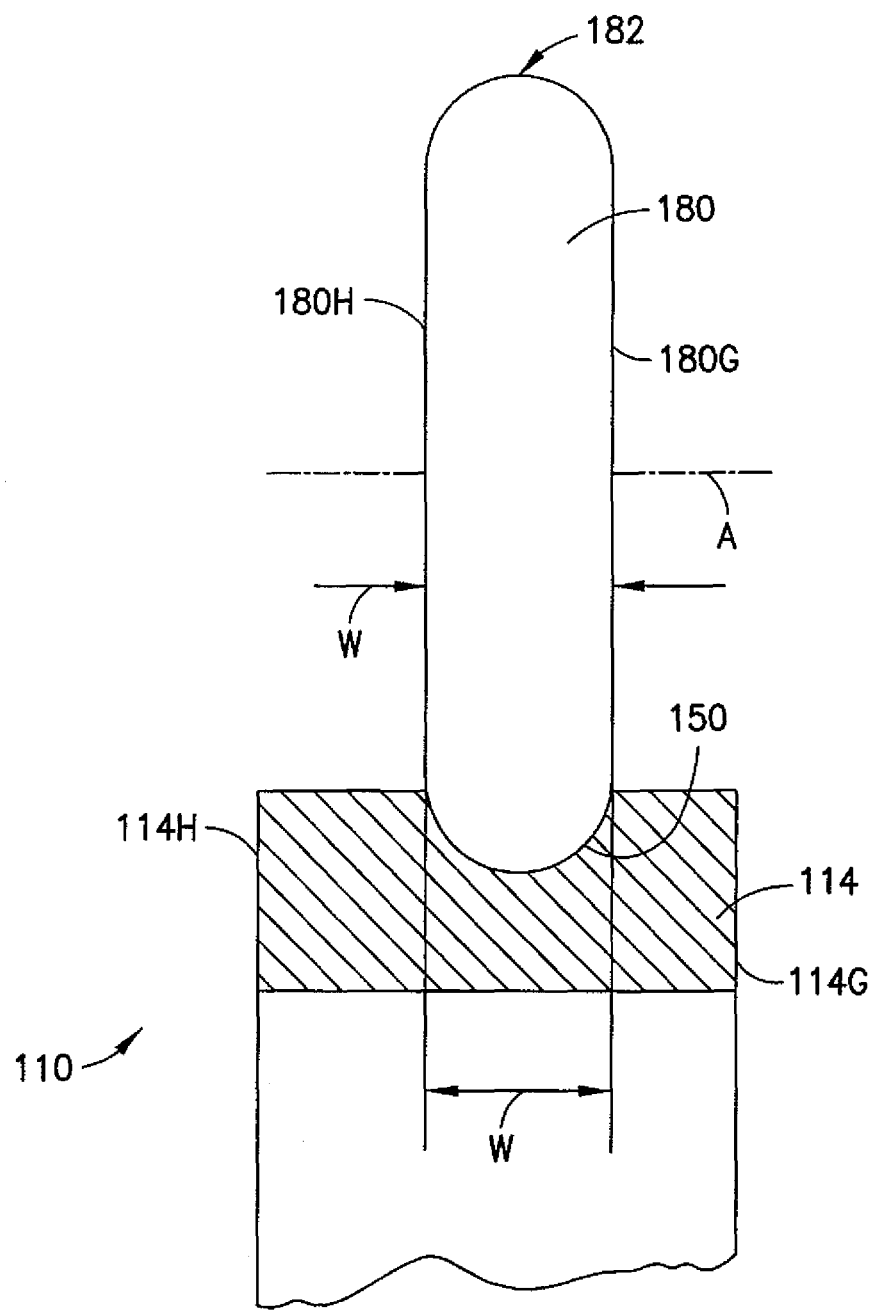
FIG. 10 is a cross-sectional view of a grinding wheel configured to form the raceway reliefs in the bearing.

Referring to FIGS. 9 and 10, a grinding wheel 180 defining a diameter D and having an edge cross-section 182, for example a semi-circular cross-section, is positioned on a bearing 110 for forming a race relief (e.g., 154) in a raceway (e.g., 150). The grinding wheel 180 has a width W measured between opposing lateral faces 180G and 180F of the grinding wheel. The width W is greater that the width WR of the raceway. The diameter D of the grinding wheel 180 is selected based upon a predetermined magnitude for the radii of curvature R1 and R2 and the lengths L1, L2, L3 and L4 of the first, second, third and fourth race reliefs 154, 164, 174 and 184. The magnitude and configuration of the width W is based upon the size of the rolling elements 112, as described above and the width WR of the raceway 150. The length and depth of the race reliefs 154, 164, 174 and 184 is controlled by the depth of insertion of the rotation grinding wheel 180 into the first or second raceway 150 or 152. In one embodiment, the race reliefs 154, 164, 174 and 184 are formed by insertion of the grinding wheel 180, rotating about an axis A, into the first or second raceway 150 or 152, before the first and second gaps 120 and 122 are formed. Thus, after the race reliefs 154, 164, 174 and 184 are formed, the gaps 120 and 122 are formed at a predetermined position in the race reliefs, for example at a midpoint of each of the race reliefs, where the race relief depth is at a maximum value.

The present invention includes a method for forming a race relief 154 in a bearing raceway. The method includes the steps of providing a bearing 110 having at least one ring 114 defining a raceway 150 formed circumferentially around the ring. The raceway 150 is positioned between opposing end faces 114G and 114H defined by the ring 114. The raceway 114 has a first width WR. A grinding wheel 180 configured for rotation about the axis A is provided. The grinding wheel 180 has a first diameter D and a second width W, greater than the first width WR of the raceway 150. In addition, the grinding wheel 180 has an arcuate cross section extending between the lateral faces 180G and 180H defined by the grinding wheel. The grinding wheel 180 is positioned above the raceway 150 so that the end faces 114G and 114H of the ring 114 and the lateral faces 180G and 180H of the grinding wheel are substantially parallel and centerlines defined by the raceway and the grinding wheel are aligned. The grinding wheel 180 is rotated about the axis A and plunged into the raceway to a predetermined depth H to form an arcuate race relief 154 therein. The race relief 154 has a width W substantially equal to that of the grinding wheel 180.

Figure 11:
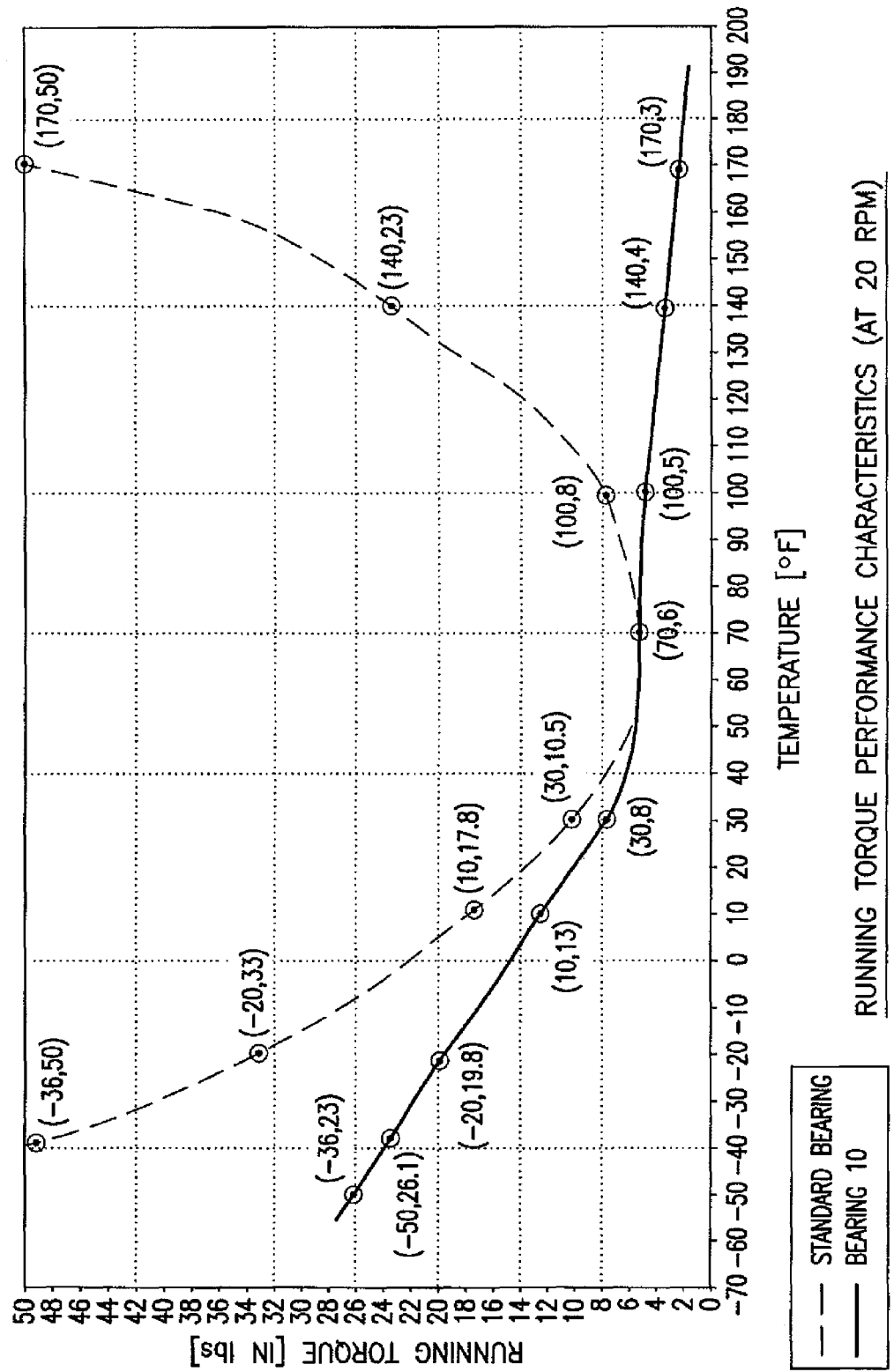
FIG. 11 is a graphical plot of running torque versus temperature for a standard bearing and the bearing of FIGS. 5-8.

FIG. 11 illustrates a graphical plot of running torque (in-lbs) versus temperature (degrees Fahrenheit, ° F.) for a standard bearing (test data is represented by the dashed line shown in FIG. 11) and for one of the bearings 10 (test data is represented by the solid line shown in FIG. 11) of the present invention. Both the standard bearing and the bearing 10 that were tested had a 311.2 mm (12.25 inch) bore, a 336.56 mm (13.25 ) inches outside diameter and 25.4 mm (1 inch) width. Both the standard bearing and the bearing 10 were manufactured from a steel alloy and were mounted in an aluminum housing having an outside diameter of about 387.4 mm (15.25 inches), a bore having a diameter of about 336.56 mm (13.25 inches). Both the standard bearing and the bearing 10 were each mounted on respective hollow aluminum shafts having an outside diameter of about 311.2 mm (12.25 inches) and an inside diameter of about 254 mm (10 inches). The standard bearing had 160 balls of 6.35 mm (0.25 inch) in diameter and the bearing 10 had 256 balls of 6.35 mm (0.25 inch) in diameter. The bearing 10 had a gap 20, 22 size of about 1.14 mm (0.45 inches) to about 1.52 mm (0.060 inches). The bearing 10 had a race relief having an overall length (i.e., L1+L2) of about 8.38 mm (0.330 inches) and a maximum depth H3, H3' of about 0.1 mm (0.004 inches) to about 0.127 mm (0.005 inches). The standard bearing had no gaps or race reliefs formed therein. The tests were conducted with the outer ring 16 being stationary and the inner ring 14 rotation at about 20 RPM. Running torque (in-lbs) required to rotate the inner ring 14 was measured at a plurality of temperatures between about negative 55° F. and about 190° F., as illustrated in FIG. 11.

As illustrated in FIG. 11 the running torque required to operate the bearing 10 was less than that required to operate the standard bearing at temperatures below about 45° F. and above about 80° F. For example, Table 1, below, illustrates exemplary running torque data corresponding to FIG. 11 and indicates the percentage of the running torque for the bearing 10 compared to that of the standard bearing. The running torque of the bearing 10 is between about 46 to 76 percent of that required for the standard bearing at temperatures between −36° F. and 30° F., respectively. The running torque of the bearing 10 is between about 6 to 62 percent of that required for the standard bearing at temperatures between 170° F. and 100° F., respectively. Table 1 indicates that the standard bearing has a running torque range of about 44 in-lbs (50 in-lbs minus 6 in-lbs) between −36° F. and 70° F. and about 44 in-lbs (50 in-lbs minus 6 in-lbs) between 170° F. and 70° F. As indicated in Table 1, the bearing 10 has a running torque range of about 17 in-lbs (23 in-lbs minus 6 in-lbs) between −36° F. and 70° F. and about 3 in-lbs (6 in-lbs minus 3 in-lbs) between 170° F. and 70° F. In addition, the test demonstrated essentially no spikes or pulses in running torque or clicking noises detected for the bearing 10. This was an unexpected result because one skilled in the relevant art would expect to hear a clicking noise as the balls traveled over the gap. One such skilled artisan would also expect spikes or pulses in the running torque as the balls traveled over the gap or traveled through the race relief. Thus the race reliefs provide the beneficial but unexpected result of reduced noise and less torque spikes and pulses compared to the standard bearing or bearings having gaps but no race reliefs.

TABLE 1

| Temperature ° F. | Standard Bearing Torque (in-lbs) | Bearing 10 Torque (in-lbs) | Percentage of torque of bearing 10 compared to the torque for the standard bearing % |
|---|---|---|---|
| −50 | Data not available | 26.1 | Data not available |
| −36 | 50 | 23 | 46 |
| −20 | 33 | 19.8 | 60 |
| 10 | 17.8 | 13 | 73 |
| 30 | 10.5 | 8 | 76 |
| 70 | 6 | 6 | 100 |
| 100 | 8 | 5 | 62 |
| 140 | 23 | 4 | 17 |
| 170 | 50 | 3 | 6 |

The test data presented in FIG. 11 and Table 1, demonstrate the unexpected result of decreased running torque compared to the standard bearing, at temperatures less than and greater than 70° F. For example, the running torque in the bearing 10 continues to decrease as temperatures increase above 70° F., while running torque for the standard bearing increases almost exponentially. As result, significantly less energy is required to operate the bearing 10, compared to the standard bearing.

Unless otherwise specified, all ranges disclosed herein are inclusive and combinable at the end points and all intermediate points therein. The terms "first," "second," and the like, herein do not denote any order, quantity, or importance, but rather are used to distinguish one element from another. Likewise, the terms "a" and "an" herein do not denote a limitation of quantity, but rather denote the presence of at least one of the referenced item. Characterizations of any feature in geometric terms (e.g., annular, circular, etc.) does not require precise adherence to geometric forms, but rather allows minor variations to accommodate reasonable manufacturing tolerances.

Although the invention has been described with reference to particular embodiments thereof, upon a reading and understanding of the foregoing disclosure, it will be understood by one of ordinary skill in the art that numerous variations and alterations to the disclosed embodiments will fall within the spirit and scope of this invention and of the appended claims.

What is claimed is:

1. A bearing comprising:
an outer ring having at least one first raceway defined by a radially inward facing surface of the outer ring;
an inner ring concentric with the outer ring and having at least one second raceway defined by a radially outward facing surface of the inner ring;
a plurality of rolling elements disposed between the outer and inner rings and rollingly engaging the first and second raceways;
a first radial gap defined in the outer ring having an outer ring gap width defined by a first edge and a second edge, the outer ring gap width being thermally expandable and contractible;
a second radial gap defined in the inner ring having an inner ring gap width defined by a third edge and a fourth edge the inner ring gap width being thermally expandable and contractible;
a first race relief extending circumferentially a first distance from the first edge and radially outwardly from the radially inward facing surface of the outer ring, the first race relief having a first race relief cicumferential length greater than the outer ring gap circumferential length;
a second race relief extending circumferentially a second distance from the second edge and radially outwardly from the radially inward facing surface of the outer ring, the second race relief having a second race relief circumferential length greater than the outer ring gap circumferential length;
a third race relief extending circumferentially a third distance from the third edge and radially inwardly from the radially outward facing surface of the inner ring, the third race relief having a third race relief circumferential length greater than the inner ring gap circumferential length; and
a fourth race relief extending circumferentially a fourth distance from the fourth edge and radially inwardly from the radially outward facing surface of the inner ring, the fourth race relief having a fourth race relief circumferential length greater than the inner ring gap circumferential length;
wherein the first and second race reliefs define a first radius of curvature, and the third and fourth race reliefs define a second radius of curvature.

2. The bearing of claim 1, wherein at least one of the plurality of rolling elements is in an unloaded state when positioned in at least one of the first race relief, the second race relief, the third race relief, the fourth race relief, the first radial gap, and the second radial gap.

3. The bearing of claim 1, wherein:
the first race relief defines a first tapered section extending from the first edge of the first radial gap;
the second race relief defines a second tapered section extending from the second edge of the first radial gap;
the third race relief defines a third tapered section extending from the third edge of the second radial gap; and
the fourth race relief defines a fourth tapered section extending from the fourth edge of the second radial gap.

4. The bearing of claim 1, wherein:
the first and second race reliefs define a concave surface; and
the third and fourth race reliefs define a concave surface.

5. The bearing of claim 1, wherein at least one of the first, second, third and fourth race reliefs has a width which is greater than a diameter of the rolling elements.

6. The bearing of claim 1, wherein the bearing is a large azimuth bearing and the first radial gap is about 1.27 mm to about 1.78 mm wide at room temperature, and the second radial gap is about 1.27 mm to about 1.78 mm wide at room temperature.

7. The bearing of claim 1, wherein a cage is disposed between the outer ring and the inner ring, the cage extending along opposing sides of the plurality of rolling elements and configured to retain the rolling elements between the outer ring and the inner ring.

8. The bearing of claim 7, wherein the cage continuously extends across the first and second radial gaps.

9. The bearing of claim 1, wherein the first radial gap and the second radial gap are configured to mitigate overloading of the bearing in response to changes in temperature of the bearing.

10. The bearing of claim 1, wherein the first radial gap and the second radial gap are configured to mitigate loss of bearing preload in response to changes in temperature of the bearing.

11. A rotating mechanism comprising:
a support structure;
a rotating structure; and
a bearing mounted on the support structure and engaging the rotating structure, the bearing comprising:
an outer ring having at least one first raceway defined by a radially inward facing surface of the outer ring;
an inner ring concentric with the outer ring and having at least one second raceway defined by a radially outward facing surface of the inner ring;
a plurality of rolling elements disposed between the outer and inner rings and rollingly engaging the first and second raceways;
a first radial gap defined in the outer ring having an outer ring gap width defined by a first edge and a second edge the outer ring gap width being thermally expandable and contractible;
a second radial gap defined in the inner ring having an inner ring gap width defined by a third edge and a fourth edge, the inner ring gap width being thermally expandable and contractible;
a first race relief extending circumferentially a first distance from the first edge and radially outwardly from the radially inward facing surface of the outer ring, the first race relief having a first race relief circumferential length greater than the outer ring gap circumferential length;
a second race relief extending circumferentially a second distance from the second edge and radially outwardly from the radially inward facing surface of the outer ring, the second race relief having a second race relief circumferential length greater than the outer ring gap circumferential length;
a third race relief extending circumferentially a third distance from the third edge and radially inwardly from the radially outward facing surface of the inner ring, the third race relief having a third race relief circumferential length greater than the inner ring gap circumferential length; and
a fourth race relief extending circumferentially a fourth distance from the fourth edge and radially inwardly from the radially outward facing surface of the inner ring, the fourth race relief having a fourth race relief circumferential length greater than the inner ring gap circumferential length;

wherein the first and second race reliefs define a first radius of curvature, and the third and fourth race reliefs define a second radius of curvature.

12. The rotating mechanism of claim 11, wherein at least one of the plurality of rolling elements is in an unloaded state when positioned in at least one of the first race relief, the second race relief, the third race relief, the fourth race relief, the first radial gap, and the second radial gap.

13. The rotating mechanism of claim 11, wherein:
the first race relief defines a first tapered section extending from the first edge of the first radial gap;
the second race relief defines a second tapered section extending from the second edge of the first radial gap;
the third race relief defines a third tapered section extending from the third edge of the second radial gap; and
the fourth race relief defines a fourth tapered section extending from the fourth edge of the second radial gap.

14. The rotating mechanism of claim 11, wherein:
the first and second race reliefs define a concave surface; and
the third and fourth race reliefs define a concave surface.

15. The rotating mechanism of claim 11, wherein at least one of the first, second, third and fourth race reliefs has a width which is greater than to a diameter of the rolling elements.

16. The rotating mechanism of claim 11, wherein the bearing is a large azimuth bearing and the first radial gap is about 1.27 mm to about 1.78 mm wide at room temperature, and the second radial gap is about 1.27 mm to about 1.78 mm wide at room temperature.

17. The rotating mechanism of claim 11, wherein the outer and inner rings have a first coefficient of thermal expansion and the support structure has a second coefficient of thermal expansion that is at least about 50% greater than the first coefficient of thermal expansion.

18. The bearing of claim 11, wherein a cage disposed between the outer ring and the inner ring, the cage extending along opposing sides of the plurality of rolling elements and configured to retain the rolling elements between the outer ring and the inner ring.

19. The bearing of claim 18, wherein the cage continuously extends across the first and second radial gaps.

20. The bearing of claim 11, wherein the first radial gap and the second radial gap are configured to mitigate overloading of the bearing in response to changes in temperature of the bearing.

21. The bearing of claim 11, wherein the first radial gap and the second radial gap are configured to mitigate loss of bearing preload in response to changes in temperature of the bearing.

* * * * *